United States Patent
Malhotra et al.

(10) Patent No.: US 8,640,215 B2
(45) Date of Patent: Jan. 28, 2014

(54) SECURE ISOLATION OF APPLICATION POOLS

(75) Inventors: Vikas Malhotra, Redmond, WA (US); Scott A. Field, Redmond, WA (US); Jaroslav Dunajsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1797 days.

(21) Appl. No.: 11/690,631

(22) Filed: Mar. 23, 2007

(65) Prior Publication Data

US 2008/0235790 A1  Sep. 25, 2008

(51) Int. Cl.
*H04L 29/06* (2006.01)

(52) U.S. Cl.
USPC .......................................................... 726/10

(58) Field of Classification Search
USPC ....................................... 726/10, 20
See application file for complete search history.

(56) References Cited

U.S. PATENT DOCUMENTS

| | | | | |
|---|---|---|---|---|
| 5,841,870 A * | 11/1998 | Fieres et al. | | 713/156 |
| 5,870,473 A * | 2/1999 | Boesch et al. | | 705/78 |
| 6,148,083 A * | 11/2000 | Fieres et al. | | 380/255 |
| 6,279,111 B1 * | 8/2001 | Jensenworth et al. | | 726/10 |
| 6,308,273 B1 * | 10/2001 | Goertzel et al. | | 726/9 |
| 6,505,300 B2 * | 1/2003 | Chan et al. | | 713/164 |
| 6,594,671 B1 * | 7/2003 | Aman et al. | | 1/1 |
| 7,031,320 B2 * | 4/2006 | Choe | | 370/395.31 |
| 7,256,715 B1 * | 8/2007 | Langhammer | | 341/51 |
| 7,350,204 B2 * | 3/2008 | Lambert et al. | | 717/172 |
| 7,433,355 B2 * | 10/2008 | Wilson et al. | | 370/392 |
| 7,443,841 B2 * | 10/2008 | Davis | | 370/356 |
| 7,564,825 B2 * | 7/2009 | Olivereau et al. | | 370/338 |
| 7,602,785 B2 * | 10/2009 | Dharmapurikar et al. | | 370/392 |
| 7,640,578 B2 * | 12/2009 | Vasnani et al. | | 726/10 |
| 2002/0019941 A1 * | 2/2002 | Chan et al. | | 713/185 |
| 2002/0099952 A1 * | 7/2002 | Lambert et al. | | 713/200 |
| 2002/0118682 A1 * | 8/2002 | Choe | | 370/395.31 |
| 2004/0006693 A1 * | 1/2004 | Vasnani et al. | | 713/168 |
| 2005/0091192 A1 * | 4/2005 | Probert et al. | | 707/1 |
| 2005/0091535 A1 * | 4/2005 | Kavalam et al. | | 713/201 |
| 2005/0091658 A1 * | 4/2005 | Kavalam et al. | | 718/104 |
| 2005/0141519 A1 * | 6/2005 | Rajgopal et al. | | 370/395.32 |
| 2005/0175010 A1 * | 8/2005 | Wilson et al. | | 370/392 |
| 2005/0251524 A1 * | 11/2005 | Shukla | | 707/100 |
| 2006/0259980 A1 | 11/2006 | Field et al. | | |
| 2006/0265714 A1 * | 11/2006 | Bissett et al. | | 718/104 |

(Continued)

OTHER PUBLICATIONS

Microsoft, Microsoft® Windows® Server 2003 Deployment Kit Deploying Internet Information Services (IIS) 6.0 a Resource Kit Publication, 2003.*

(Continued)

*Primary Examiner* — Michael S McNally
(74) *Attorney, Agent, or Firm* — Perkins Coie LLP

(57) ABSTRACT

A secure web hosting system is provided. In various embodiments, the secure web hosting system identifies an application that is to be loaded, creates a security token that is unique to the computer system and based on a name of the identified application, receives a request to load the identified application, and creates a process in which to load the identified application, the process having security attributes associated with the created security token. In various embodiments, the secure web hosting system includes an isolation service component that creates a security token based on an application name of an application identified by the configuration file.

18 Claims, 6 Drawing Sheets

(56) References Cited

U.S. PATENT DOCUMENTS

| | | | |
|---|---|---|---|
| 2006/0277415 A1* | 12/2006 | Staring et al. | 713/193 |
| 2007/0038994 A1* | 2/2007 | Davis et al. | 717/174 |
| 2007/0067321 A1* | 3/2007 | Bissett et al. | 707/100 |
| 2007/0094667 A1* | 4/2007 | Bissett et al. | 718/104 |
| 2007/0136579 A1* | 6/2007 | Levy et al. | 713/168 |
| 2007/0156842 A1* | 7/2007 | Vermeulen et al. | 709/217 |
| 2008/0052770 A1* | 2/2008 | Ali et al. | 726/9 |

OTHER PUBLICATIONS

"Access Tokens," Security, Platform SDK: Authorization, last updated Jan. 2005, Microsoft Corporation, 2 pages, http://msdn.microsoft.com/library/en-us/secauthz/security/access_tokens.asp?frame=true.

"Platform SDK: Security Glossary—A," last updated Dec. 2004, Microsoft Corporation, 2 pages, http://msdn.microsoft.com/library/en-us/secgloss/security/a_gly.asp?frame=true.

"Platform SDK: Security Glossary—S," last updated Dec. 2005, Microsoft Corporation, 5 pages, http://msdn.microsoft.com/library/en-us/secgloss/security/s_gly.asp?frame=true.

"Security Identifiers," Platform SDK: Authorization, last updated Jan. 2005, Microsoft Corporation, 2 pages, http://msdn.microsoft.com/library/en-us/secauthz/security/security_identifiers.asp?frame=true.

"SHA hash functions," Information from Answers.com, Computer Desktop Encyclopedia, 1981-2005 Computer Language Company Inc., 6 pages, http://www.answers.com/topic/sha-family.

* cited by examiner

SECURE ISOLATION OF APPLICATION POOLS

BACKGROUND

Operating systems that manage computing devices can provide various services to system programs, application programs, external programs, and so forth. An example of such an operating system service that provides Internet services (e.g., MICROSOFT INTERNET INFORMATION SERVER) is commonly referred to as a "web server." A web server may contain several application pools, each of which is a collection of one or more web applications. Each web application may operate in one or more processes that the operating system associates with the web server. As an example, the web server may start a process for each web application. Subsequent requests to the web application may be handled by the process started for that web application.

Each process executes in the security context of a user account. User accounts (or simply "accounts") can have various security attributes. While some accounts have increased security attributes, such as an administrator account, other accounts have reduced security attributes, such as an Internet user account. The security attributes can indicate to what operating system resources (or other resources) the account has various permissions. Web applications inherit the security attributes of the processes in which they execute. Thus, system administrators generally configure specific accounts for each web application. As an example, system administrators may configure accounts such that one web application cannot interact with another web application and cannot access other resources of the operating system on which the web server operates. Typically, accounts associated with web applications are provided very minimal permissions so that a web application cannot inadvertently or maliciously interact with other aspects of the web server, such as other web applications. The accounts are conventionally created and managed in relation to the web server or a network security resource, such as ACTIVEDIRECTORY.

User accounts can be associated with security tokens, such as security identifiers (SIDs). A SID is a value of variable length that can be used to identify a security principal or security group in operating systems, such as a user account. The SID can be associated with various security attributes so that, for example, different SIDs can have different permissions on resources of the operating system. Typically, a SID with minimal security attributes is created for processes that handle web applications.

Managing accounts can be problematic. System administrators need to ensure that each account that is added has the correct set of security attributes. Otherwise, a web application may be able to exploit a security vulnerability, such as to take actions that are undesirable or harmful to the web server or other web applications. System administrators may need to ensure that passwords associated with these accounts satisfy various security policies, such as needing to be changed periodically.

A system administrator of an Internet Service Provider (ISP) may administer hundreds of web servers. Thus, when deploying a web application to multiple web servers, the system administrator generally configures each web server or employs a network security resource to set up accounts for the web application. Each such account then needs to be administered, such as to comply with various security policies. ISPs that host many web applications may need accounts for each web application, and so deploying web applications can become quite tedious and prone to error.

SUMMARY

A secure web hosting system is provided. The secure web hosting system can facilitate application deployment by configuring user accounts automatically so as to provide secure isolation of application pools. The secure web hosting system can automatically create a security token, such as a security identifier (SID), for each web application or application pool (hereinafter, "application"). The created SID can be independent of the computer system and the user account in which the web server operates. The secure web hosting system can employ a one-way hash function to create the SID based on an application name indicated in a configuration file the web server loads to configure applications and can provide the SID with minimal security attributes sufficient for the application. The web server loads the configuration file when the web server starts or after the configuration file changes, such as when a new application is added to the configuration file. By creating a unique SID for each application when the web server loads the configuration file, system administrators can be relieved of their responsibility to manage user accounts for applications. Because system administrators no longer need to create accounts for each application, they can easily deploy applications by performing a simple file copy operation from a storage to each web server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
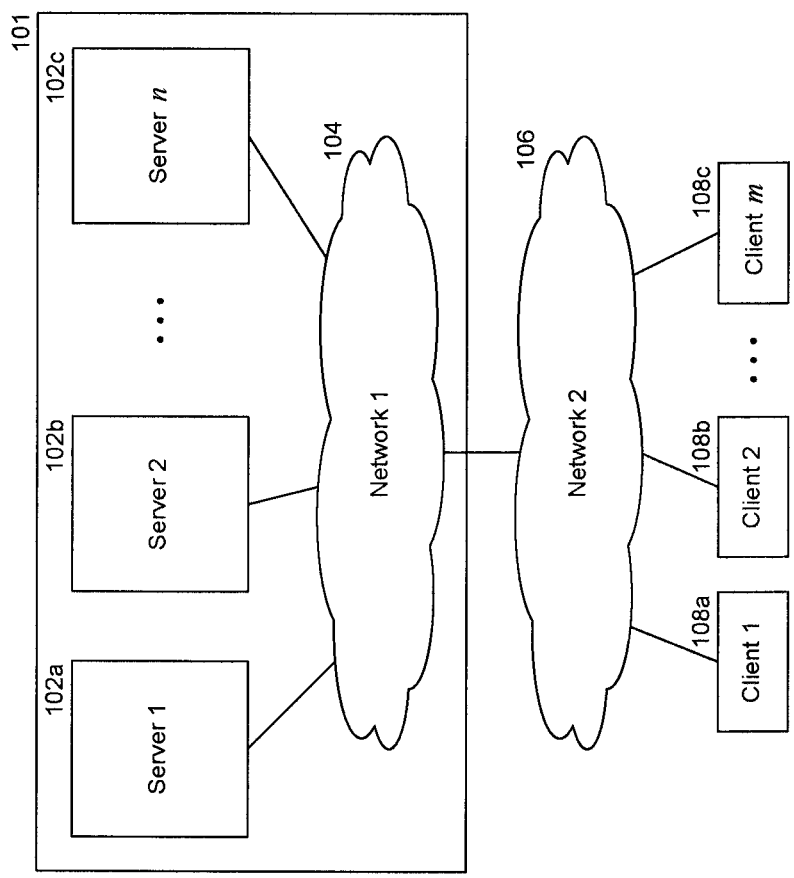
FIG. 1 is a block diagram illustrating an environment in which the secure web hosting system may operate in some embodiments.

A secure web hosting system is provided. In various embodiments, the secure web hosting system facilitates application deployment by configuring user accounts automatically so as to provide secure isolation of application pools. The secure web hosting system can automatically create a security token, such as a security identifier (SID), for each web application or application pool (hereinafter, "application"). The created SID can be independent of the computer system and the user account in which the web server operates. The secure web hosting system can create the SID based on an application name indicated in a configuration file that the web server loads to configure applications and can provide the SID with minimal security attributes sufficient for the application.

The web server loads the configuration file when the web server starts or after the configuration file changes, such as when a new application is added to the configuration file. By creating a unique SID for each application when the web server loads the configuration file, system administrators can be relieved of their responsibility to manage user accounts for applications. The secure web hosting system may employ types of security tokens other than SIDs in various embodiments.

In various embodiments, the secure web hosting system applies a one-way hash function, such as a Secure Hash Algorithm, to the name of the application or application pool to create a hash value and may include the hash value as part of the SID it creates for the application. The SID for an application can begin with a prefix, such as "S-1-5-81-," and end with a suffix comprising the hash value. An example of a SID the secure web hosting system creates can be "S-1-5-81-12345-123456." The prefix can identify a service, such as the web server. The suffix can uniquely identify the application. Because the SID for an application is unique and independent of the computer system and account employed by the web server, security attributes associated with each SID can also be independent of the computer system, the account employed by the web server, and the applications. Because the SID is automatically created based on the application name, the applications can be easily deployed to any number of computer systems. The secure web hosting system executing on each such computer system will create the SIDs automatically when the web server loads the configuration file that lists the applications. Moreover, when an application is removed from a web server (e.g., by removing the application from the configuration file), the secure web hosting system automatically removes the SID from the associated computer system, such as by not creating the SID when the application starts. Thus, the secure web hosting system relieves system administrators from managing accounts for applications.

In some embodiments, the configuration file is stored in a configuration store that includes multiple configuration files. The web server may load one or more configuration files from the configuration store when the web server starts or when the configuration file changes. The configuration files may be human-readable and can be defined using an extensible markup language (XML). Thus, a system administrator can configure a web server using various tools, such as a simple file editing tool or a configuration management tool. The configuration store and the configuration files contained therein may only be accessible by system administrators and other user accounts having high security privileges, such as an operating system's SYSTEM account and the account employed by the web server and the secure web hosting system.

When the web server loads a configuration file, it may request the secure web hosting system to create accounts. As an example, the secure web hosting system may create a SID for the applications listed in the configuration file. The secure web hosting system may also create additional accounts, as indicated in the configuration file. The secure web hosting system may specify security attributes associated with each account it creates. As an example, the secure web hosting system may specify that the SID it creates for each application has rights and permissions relating to various operating system resources and subsystems that the process handling the application may require, such as portions of the registry, file system, and so forth. In some embodiments, the SIDs the secure web hosting system creates require no password so that a user who requests an application's page (e.g., web page) from the web server is not prompted for a password.

In some embodiments, the secure web hosting system may detect that the configuration file has changed and may take actions relating to SIDs it creates. As an example, the secure web hosting system may remove SIDs it previously created but are no longer necessary because the associated application is no longer listed in the configuration file. Alternatively, the secure web hosting system may create additional SIDs relating to applications newly added to the configuration file.

Because system administrators no longer need to create accounts for each application, they can easily deploy applications by performing a simple file copy operation from a storage to each web server. The secure web hosting system may then automatically create SIDs for each application listed in the configuration file without further intervention. The secure web hosting system may also manage the accounts, such as to remove SIDs when they are no longer needed. Because these SIDs may not need passwords, system administrators are relieved of an additional burden of account management. Thus, the secure web hosting system facilitates application deployment and sets up user accounts automatically so as to provide secure isolation of application pools.

The secure web hosting system will now be described with reference to the figures. FIG. 1 is a block diagram illustrating an environment in which the secure web hosting system may operate in some embodiments. The environment can include a web hosting site 101 comprising one or more servers 102*a*, 102*b*, and 102*c*. The servers may include web servers and are described in further detail below in relation to FIG. 2. The web servers may be interconnected via a network 104. The network 104 can be an intranet or other type of network. The network 104 may be connected to another network 106, such as the Internet. One or more client computing devices 108*a*, 108*b*, and 108*c* may be connected via the network 106.

The computing devices on which the secure web hosting system operates may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the secure web hosting system. In addition, the data structures and message structures may be stored or transmitted via a data transmission medium, such as a signal on a communications link. Various communications links may be employed, such as the Internet, a local area network, a wide area network, or a point-to-point dial-up connection.

The secure web hosting system may use various computing systems or devices including personal computers, server computers, hand-held or laptop devices, multiprocessor systems, microprocessor-based systems, programmable consumer electronics, electronic game consoles, network PCs, minicomputers, mainframe computers, distributed computing environments that include any of the above systems or devices, and the like. The secure web hosting system may also provide its services to various computing systems, such as personal computers, cell phones, personal digital assistants, consumer electronics, home automation devices, and so on.

The secure web hosting system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
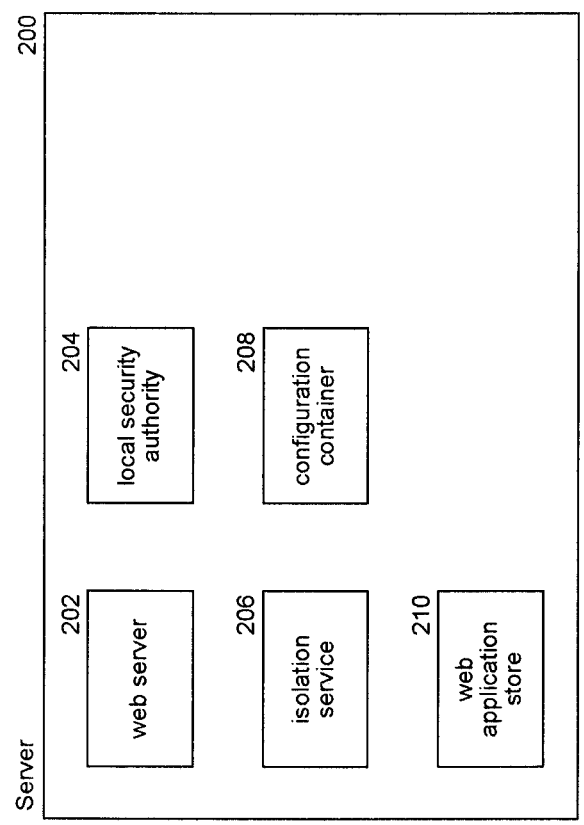
FIG. 2 is a block diagram illustrating a server of the secure web hosting system in some embodiments.

FIG. 2 is a block diagram illustrating a server of the secure web hosting system in some embodiments. The server 200 can include a web server component 202, a local security authority component 204, an isolation service component 206, a configuration container component 208, and a web application store component 210. The web server component 202 can be an operating system service that provides web services, such as MICROSOFT INTERNET INFORMATION SERVER. The local security authority (LSA) component 204 can be an operating system subsystem that provides authentication services. The LSA may provide an application program interface (API) that other operating system subsystems or applications may employ to authenticate accounts. As an example, an operating system subsystem may invoke the API provided by the LSA to determine whether an application that executes in a process having the security context of the account associated with the process should be permitted to take an action that the application requests. The LSA may operate in conjunction with a trusted computing base (TCB). The TCB is a logical boundary that defines the portion of an operating system that is entrusted to enforce a security policy. Code that executes within the TCB is able to perform operations without being subjected to normal security checks that operating system components or subsystems may perform by invoking the LSA's API. As an example, device drivers may run within the TCB.

The isolation service 206 provides secure isolation services to the web server. As an example, the isolation service can create accounts for web applications when so requested by the secure web hosting system. The isolation service may execute as a privileged "local system" process in the operating system that executes within the TCB. In some embodiments, the isolation service can employ the LSA to create SIDs based on the application name.

The configuration container 208 can contain one or more configuration files. As an example, the configuration container can include configuration files that the web server loads when it starts. Configuration files are described in further detail below in relation to FIG. 3. The web server may also reload a configuration file when the configuration file changes. As an example, when a system administrator deploys a new web application, the system administrator may cause the configuration file to change. When the configuration file changes, the web server may reload the configuration file so that new accounts can be created and the new web application can be loaded. The web application store 210 may store resources associated with web applications, such as files.

Figure 3:
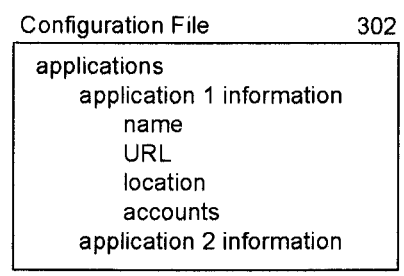
FIG. 3 is a block diagram illustrating a configuration file employed by the secure web hosting system in some embodiments.

FIG. 3 is a block diagram illustrating a configuration file employed by the secure web hosting system in some embodiments. The configuration file 302 can identify one or more applications. As an example, the illustrated configuration file identifies two web applications, application 1 and application 2. Each identified web application may be associated with additional information. As an example, the illustrated configuration file indicates a URL, the location of resources associated with the web application, such as files, and a list of accounts. The secure web hosting system may employ the list of accounts to create additional SIDs that the web application may need. In some embodiments, the list of accounts may identify security attributes that these accounts need.

Figure 4:
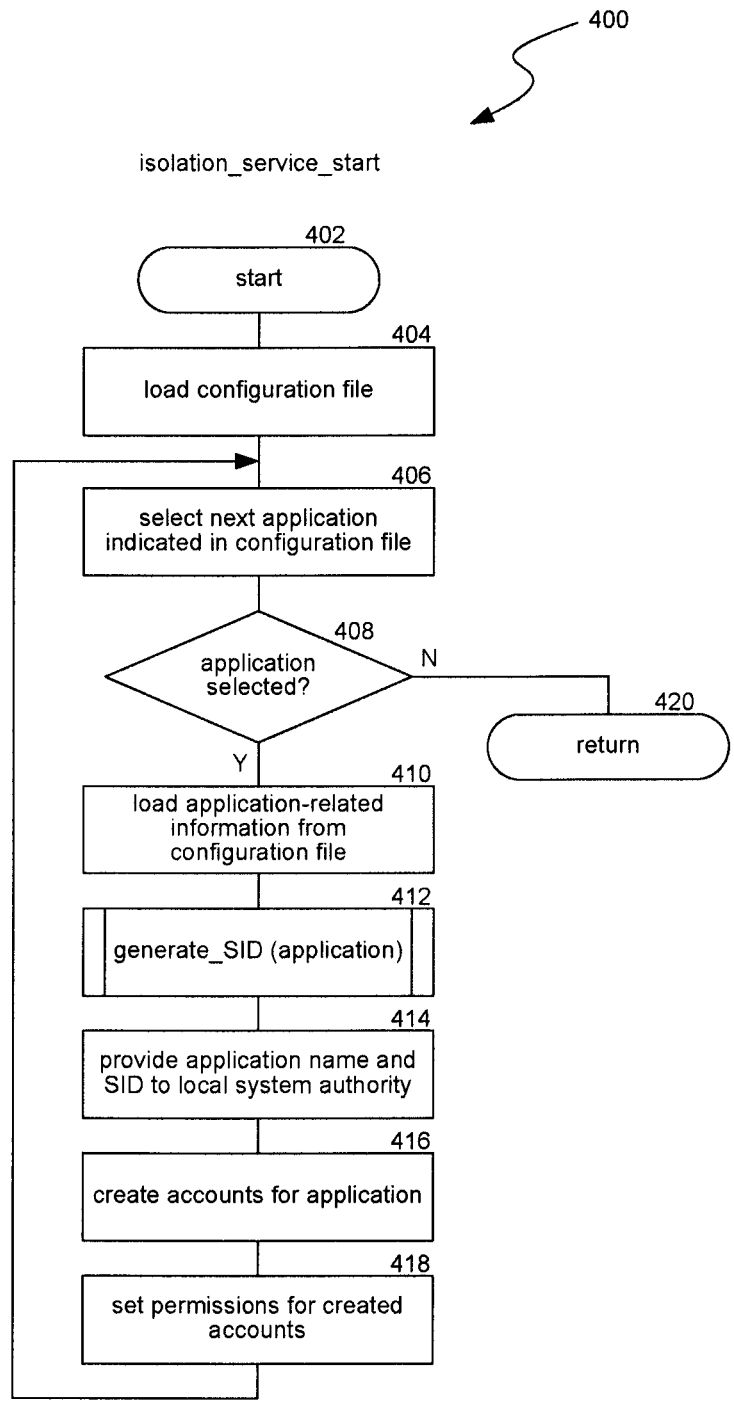
FIG. 4 is a flow diagram illustrating an isolation_service_start routine invoked by the secure web hosting system in some embodiments.

FIG. 4 is a flow diagram illustrating an isolation_service_start routine invoked by the secure web hosting system in some embodiments. The secure web hosting system may employ the routine 400 when the web server starts. The routine begins at block 402. At block 404, the routine loads a configuration file. An example of the configuration file is illustrated in FIG. 3 and described above. At block 406, the routine selects the next application indicated in the configuration file. At decision block 408, the routine determines whether an application was selected. When all applications have already been processed by the routine, another application would not be selectable. When an application was not selected, the routine continues at block 420, where it returns. When an application was selected, the routine continues at block 410. At block 410, the routine loads application-related information from the configuration file. As an example, the routine may load the application's name, URL, location, and so forth. At block 412, the routine generates a SID for the application by invoking a generate_SID subroutine. The generate_SID subroutine is described in further detail below in relation to FIG. 6. The routine can provide an indication of the application name to the generate_SID routine as a parameter. At block 414, the routine provides the application name and the generated SID to the local system authority (LSA) so that the LSA has a mapping between the application and the SID. The LSA employs this mapping so that other tools can display the application name, such as in a user interface associated with an administrative tool. The administrative tool may employ an API provided by the LSA to request a human-readable application name based on a SID. The human-readable application name may be the name identifying the application in the configuration file. The routine may invoke a LsaSidNameMappingOperation_Add API provided by the LSA to create the mapping.

At block 416, the routine creates accounts for the application. As an example, the routine causes the LSA to create the SIDs returned by the generate_SID subroutine. At block 418, the routine sets permissions for the created accounts. The routine then continues at block 406.

Those skilled in the art will appreciate that the logic illustrated in FIG. 4 and described above, and in each of the flow diagrams discussed below, may be altered in a variety of ways. For example, the order of the logic may be rearranged, substeps may be performed in parallel, illustrated logic may be omitted, other logic may be included, etc.

Figure 5:
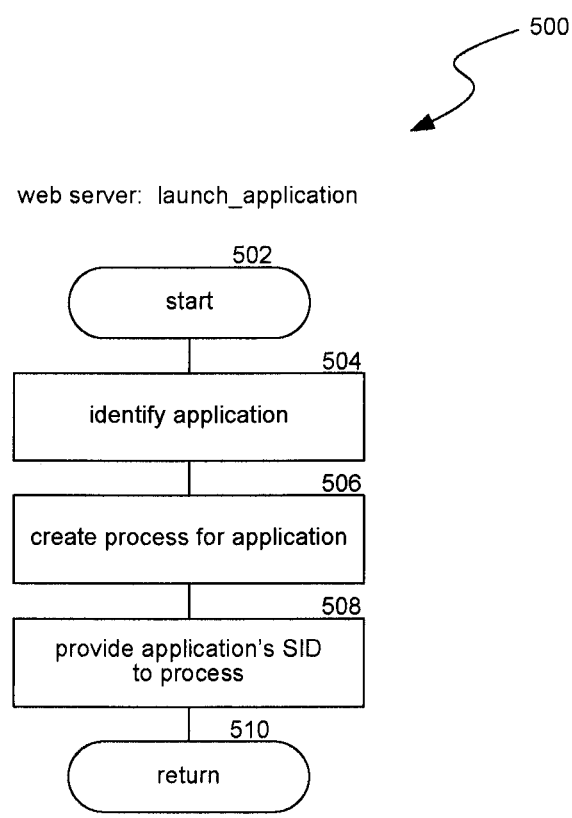
FIG. 5 is a flow diagram illustrating a launch_application routine invoked by a web server of the secure web hosting system in some embodiments.

FIG. 5 is a flow diagram illustrating a launch_application routine invoked by a web server of the secure web hosting system in some embodiments. The routine 500 may be invoked by a web server when it launches an application, such as when the web server first receives a request relating to the application. The routine begins at block 502. At block 504, the routine identifies the application, such as based on a URL or other indication provided by the request. At block 506, the routine creates a process for the application. The routine may employ a LogonUserExEx API when creating the process to provide the created SID. In some embodiments, the web server may create a single process for the application. Thus, the web server may first determine whether a process has already been started for the application. When an application has already been started, the routine may not create another process for the application in these embodiments. At block 508, the routine provides the application's SID to the created process. The routine then returns at block 510.

Figure 6:
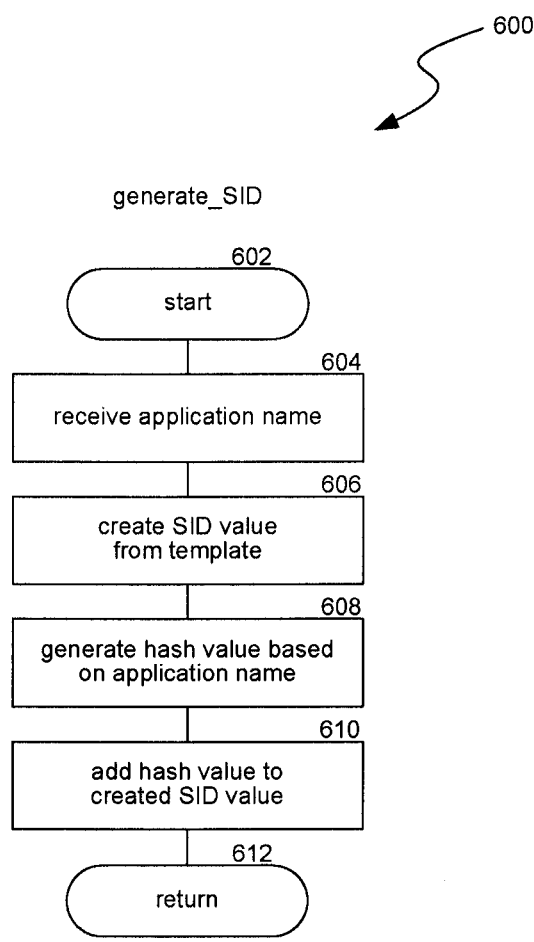
FIG. 6 is a flow diagram illustrating a generate_SID routine invoked by the secure web hosting system in some embodiments.

FIG. 6 is a flow diagram illustrating a generate_SID routine invoked by the secure web hosting system in some embodiments. The routine 600 begins at block 602. At block 604, the routine receives an application name. The application name can be the name of a web application or an application pool's name. At block 606, the routine creates a SID value from a template. As an example, the template can specify a prefix value for the SID. In some embodiments, the prefix value is "S-1-5-81-."

At block 608, the routine generates a hash value based on the application name received at block 604. In some embodiments, the routine employs a secure hash algorithm and provides an indication of the application's name to the algorithm so that a hash value can be generated based on the name. Because the hash value is not specific to any spoken language, the account that is created for localized versions of applications does not need to be localized.

At block 610, the routine adds the hash value to the created SID, such as by adding the hash value as a suffix to the SID. At block 612, the routine returns. In some embodiments, the routine may return the created SID value.

Additional aspects of the secure web hosting system are described in commonly assigned patent application Ser. No. 11/131,431, entitled "Method and System for Limiting Rights of Services" and filed on May 16, 2005, the disclosure of which is incorporated herein by reference in its entirety.

Although use of the secure web hosting system is described in relation to web servers, the concept can be equally applied to isolating third-party stored procedures in database servers, such as MICROSOFT SQL SERVER, isolating COM or DCOM objects in MICROSOFT WINDOWS, and so forth. The secure web hosting system may also be applied to isolate dynamic link libraries that are loaded by applications, such as when loading extensions to the applications that are provided by third parties.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I/We claim:

1. A method performed by a computer system for securely isolating applications at a server, comprising:
   identifying an application that is to be loaded;
   creating a security token that is unique to the computer system and based on a name of the identified application, wherein the security token is a security identifier having a prefix that is common to all created security tokens;
   receiving a request to load the identified application; and
   creating a process in which to load the identified application, the process having security attributes associated with the created security token.

2. The method of claim 1 wherein the security token is a security identifier.

3. The method of claim 1 wherein the security token is a security identifier having a prefix that is common to all created security tokens and is associated with a web server that creates the process.

4. The method of claim 1 further comprising providing indications of the application name and the identified application to a local system authority.

5. The method of claim 1 wherein the creating a security token includes generating a hash value based on the name of the identified application.

6. The method of claim 1 wherein the creating a security token includes generating a hash value based on the name of the identified application using a secure hash algorithm.

7. A system for securely isolating applications at a server, comprising:
   a processor and memory;
   a web server component that receives and processes requests for applications;
   a configuration store component that stores a configuration file associated with the web server component; and
   an isolation service component that creates a security token based on an application name of an application identified by the configuration file when the web server component loads the configuration file, wherein the security token is a hash value based on the name of the identified application and is unique to the server and has a prefix that is common to all created security tokens.

8. The system of claim 7 wherein the configuration file identifies multiple applications and each application is associated with a name.

9. The system of claim 7 wherein the isolation service component provides an indication of the application name and created security token to a local system authority component.

10. The system of claim 7 wherein when the web server component receives a request for the application, the web server component creates a process to handle the application in a security context associated with the created security token.

11. The system of claim 7 further comprising a local security authority component that sets security permissions associated with processes created by the web server, the security permissions relating to the created security token.

12. The system of claim 11 wherein the security permissions are specified in the configuration file.

13. A memory device storing computer-executable instructions that, when executed, cause a computer system to perform a method for securely isolating applications at a server, the method comprising:
   identifying an application that is to be loaded;
   creating a security token that is unique to the computer system and based on a name of the identified application;
   providing the created security token and an indication of the application name to a local system authority;
   creating an account for the identified application; and
   creating a process for the identified application upon receiving a request for the application, the created process having security attributes relating to the created security token.

14. The memory device of claim 13 further comprising instructions for setting permissions for the created account.

15. The memory device of claim 13 further comprising instructions for providing the created security token to the created process.

16. The memory device of claim 13 further comprising instructions for generating a hash value using a one-way hash function based on the name of the identified application.

17. The memory device of claim 13 further comprising instructions for creating the security token that employs a prefix and a hash value, the hash value created using a secure hash algorithm based on the name of the identified application.

18. The memory device of claim 17 wherein the prefix is "S-1-5-81."

* * * * *